(12) United States Patent
Petrov

(10) Patent No.: US 7,335,116 B2
(45) Date of Patent: Feb. 26, 2008

(54) METHOD AND APPARATUS FOR LOCATING THE TRAJECTORY OF AN OBJECT IN MOTION

(76) Inventor: Dimitri Petrov, 4570 Draper Avenue, Montreal, Quebec (CA) H4A 2P4

( * ) Notice: Subject to any disclaimer, the term of this patent is extended or adjusted under 35 U.S.C. 154(b) by 2 days.

(21) Appl. No.: 10/964,660

(22) Filed: Oct. 15, 2004

(65) Prior Publication Data

US 2005/0153786 A1 Jul. 14, 2005

(51) Int. Cl.
*A63B 57/00* (2006.01)

(52) U.S. Cl. .................................................. 473/407

(58) Field of Classification Search ............... 473/141, 473/165, 198–200, 407
See application file for complete search history.

(56) References Cited

U.S. PATENT DOCUMENTS

| | | | |
|---|---|---|---|
| 5,303,924 A | 4/1994 | Kluttz et al. | |
| 5,413,345 A | 5/1995 | Nauck | |
| 5,472,205 A | 12/1995 | Bouton | |
| 5,489,099 A | 2/1996 | Rankin et al. | |
| 5,700,204 A * | 12/1997 | Teder | 473/199 |
| 5,846,139 A | 12/1998 | Bair et al. | |
| 5,926,780 A | 7/1999 | Fox et al. | |
| 5,938,545 A * | 8/1999 | Cooper et al. | 473/407 |
| 6,012,987 A | 1/2000 | Nation | |
| 6,093,923 A | 7/2000 | Vock et al. | |
| 6,520,864 B1 | 2/2003 | Wilk | |

FOREIGN PATENT DOCUMENTS

EP 1 096 219 A1 5/2001

OTHER PUBLICATIONS

Barras, CH., Optical Location of high-velocity objects at close range, Franco-German Research Institute Saint Louis, report S-R 904/92.

* cited by examiner

*Primary Examiner*—Kim Nguyen
(74) *Attorney, Agent, or Firm*—David J. French

(57) ABSTRACT

An object locating system detects the presence of an object as it passes through two consecutive planar fields of view. Two pairs of optical sensor arrays with multiple, directed, pixel detectors observe the object from two angles as the object passes through each consecutive field of view. The locations of penetrations of the respective fields of view are calculated by triangulation. Using this data, the known location of the take-off point and/or the delay between penetrations, the trajectory of the object in time and space is calculated. Applications include projecting the range of a driven golf ball, measuring the respective arriving and departing velocities of a hit baseball, and determining the trajectory and origin of an arriving projectile, as in the case of the threat to a military vehicle.

23 Claims, 5 Drawing Sheets

METHOD AND APPARATUS FOR LOCATING THE TRAJECTORY OF AN OBJECT IN MOTION

FIELD OF THE INVENTION

This invention relates to a detection system for determining the position, velocity and trajectory in space of moving objects, such as golf balls and baseballs for the purpose of training and practicing as well as other objects such as the detection of projectiles approaching a vehicle. It can also be used to evaluate the mechanical characteristics of a baseball bat, tennis racket, or the like by comparing the ball's velocity before and after the collision with the baseball bat or racket, etc. Moreover, it can accurately determine whether or not a baseball crosses the strike zone by tracking its trajectory in front of the home plate.

BACKGROUND TO THE INVENTION

Numerous systems exist for tracking a golf ball and estimating its range. Their main purpose is to give golfers a graphic and/or numeric display indicating their drive's effectiveness when they practice or play.

U.S. Pat. No. 5,303,924 describes a golf game apparatus that simulates a total golf shot distance based upon the actual flight of a struck golf ball at a practice range, projecting the flight distance of the ball to an initial impact position on a target area. A microphone in the area detects the take off of the ball struck by the club head, and an array of microphones in the target area detects its arrival. The time between the two events can be correlated to the range. The system requires a semi-permanent installation.

U.S. Pat. No. 5,413,345 describes a system that identifies, tracks, displays and records all or selected portions of the path of one or more golf balls. It performs these functions from the time each ball is struck, or after it is in flight, until it reaches the final point of rest. It uses an array of high-speed cameras installed on the green.

U.S. Pat. No. 5,472,205 describes a system that detects the club head offset angle relative to a desired club head axis as well as the speed of club head by sensing light reflected from the underside of the club head and processing this information electronically. The latter can be used to calculate the ball's speed by assuming an efficiency of momentum transfer from the club head to the ball. The system requires a semi-permanent installation.

U.S. Pat. No. 5,489,099 describes a system comprising a video camera, a video processor and a flight path predictor. A video camera locks onto the ball and tracks it while being rotated by an automatic control system.

U.S. Pat. No. 5,846,139 describes a golf simulator consisting of three arrays of infrared receivers and emitters installed in an enclosure providing a shield from the ambient light. The system determines the ball's velocity vector. It requires a permanent installation.

U.S. Pat. No. 5,926,780 describes a system for measuring a ball's velocity vector. It consists of two arrays of light sensors illuminated from above by two light sources. When the ball is struck, it flies over the two arrays and casts a shadow over a few sensors. Their location in the array and the position of the light sources allows the calculation of the ball's velocity vector. The patent does not address the exposure of the arrays to the ambient light. The system requires a semi-permanent installation.

U.S. Pat. No. 5,938,545 describes a system comprising two video cameras mounted on a golf cart. Their fields of view overlap and they track the ball by successive frame scans. The ball's trajectory is determined with respect to the cart, which is at an angle with respect to the launch pointer target line and at a certain distance from this reference point. This angle and this distance must both be known in order to relate the trajectory to the target line and to the position of the golfer. The system does not address the saturation effect of the sun on the area CCD sensor in the camera.

U.S. Pat. No. 6,012,987 describes an electronic surveillance camera and a motion sensor above the green. Signals from the camera and the motion sensor are transmitted to a processing unit. The latter generates the movement of an object on a video screen. The system requires a semi-permanent installation.

U.S. Pat. No. 6,093,923 describes two or more video cameras installed on a drive range tracking a golf ball within their fields of view. The system then electronically simulates the ball's trajectory to determine the ball's probable point of impact.

U.S. Pat. No. 6,520,864 describes a video camera tracking a golf ball against a stationary background. A computer processes the video signal to detect the golf ball and to automatically determine its trajectory.

Reference [1]: Barras, Ch., Localisation optique d'objets rapprochés animés d'une grande vitesse (Optical location finding of high-velocity objects at close range), Institut franco-allemand de recherche de Saint-Louis (Franco-German Research Institute Saint-Louis), report S-R 904/92. Though arising in a field unrelated to the tracking of out-going objects, this reference [1] describes a system for protecting a military vehicle consisting of a pair of photo-diode arrays with lenses that form fan-shaped fields of view overlapping in a single plane. It can detect at close range the position of an incoming projectile aimed at a vehicle. However, it cannot determine the velocity, nor the direction of the threat.

Reference [2]: European patent application by Giat Industries, EP 1 096 219 A1. Inventors: Lefebvre, Gérald and Muller, Sylvain; Procédé et systéme pour détecter une menace tirée sur un objet fixe ou mobile. (Method and system for detecting a threat fired at a stationary or moving object). Applicant, Publication date: May 2, 2001. This reference [2] describes a similar military-focus system concerning incoming objects in which two arrays with lenses installed on either side of the front of a military vehicle define four vertical intersecting fields of view. It explains how measuring the time when a projectile penetrates each planar field of view and knowing the angle between the lines joining the penetration points to the sensors, on the one hand, and the horizontal plane, on the other hand, provides sufficient information for calculating the position of the projected penetration points and the velocity vector of the incoming projectile. This system covers only a military application related to the calculation of an incoming projectile's position and velocity vector, wherein the trajectory is assumed to be linear. This reference relies upon making four successive time measurements. This reference does not address the determination of the path of an outgoing object, much less determining a projected trajectory calculated as a parabola corrected for aerodynamic drag. Furthermore, this patent application does not mention how to prevent the over saturation of the diode array when the image of the sun is focused on it.

There is a need for a sports training system for tracking an object in space that does not require a semi-permanent installation, but can be set up and ready for use in a short time and within a limited space. Such a system can facilitate the training of golf players, baseball players, tennis players and players of other sports based upon control of a projectile. The device could also be used in the evaluation of the mechanical properties of a baseball bat, golf club, tennis racket, or other device used for striking an incoming projectile.

Imaging systems can form an image of an object on a planar surface, as in the case of a charge-coupled device, CCD, employed in a video camera. Such planar images require time to sample all of the pixels available in an x, y array. Simpler imaging systems utilize a linear array that provides a far smaller number of pixel sensors. The sampling time is accordingly substantially reduced. However, such known linear arrays can only sample a planar surface in space, viewed edge-on.

Such linear arrays can be provided with directed pixel sensors, aligned to divide the surface of the viewing plane into a discrete number of viewing sectors. Thus an 82.4-degree field of view divided amongst 512 directed pixel sensors will allow each directed sensor to detect an object present within a detection zone having an average angular dimension of 0.161 degrees within the detection plane.

While providing some image information with respect to the location of an object in space, the full location of an object, much less its trajectory, cannot be defined through use of a single linear array of directed pixel sensors. This invention addresses a method by which multiple linear arrays having directed pixel sensors may be utilized to obtain more information about the location of an object, and according to variants, defining not only its instantaneous location in space, but also its path of travel, local velocity and ultimate trajectory.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to the invention in a first variant, two linear detection optical sensor arrays, each having a plurality of directed pixel sensors, are positioned to provide overlapping fields of view in or substantially within a common, shared, planar field of view. By triangulation, the position of the object within the common field of view can then be calculated. Knowing the baseline between the two detection arrays and the angular orientation in space of the common field of view, the precise position in space of the object can be calculated and the time of its penetration of such field can be recorded.

The respective fields of view of the two linear detection arrays need not be precisely co-planar. If such fields of view are sufficiently proximate to each other an object of finite length may simultaneously be detected in both fields. Furthermore, taking the hypothetical case of an infinitely small object, the consecutive detection of the object by the first and second arrays over a very short interval can be taken, as an approximation, as being simultaneous. In either case, by treating the respective fields of view as if they were coplanar, the location of the object in space can be calculated.

According to a feature of the invention, two linear detection arrays may be said to constitute a "set of arrays". By employing a pair of such sets, each set providing respective, shared, common fields of view, an accurate measurement can be made of the position of the tracked object at two locations. This can be used to establish the local trajectory or the line of travel of an object. In the case of a launched projectile, e.g. a golf ball, for which the takeoff point is known, the initial parabolic path of such projectile can be established without taking time measurements. Recording the time between the successive intersections of the object with the respective common fields of view allows the object's immediate velocity to be established. This provides a further means for determining the initial parabolic path of a projectile.

When the object penetrates the first common field of view of the first set of position sensor arrays, a first set of coordinates, x-coordinate $a_1$ and y-coordinate h is calculated by a data processor based on data provided by such sensors. The same sequence of events is repeated when the object enters the second planar field of view and a second set of coordinates is calculated. The path of travel is defined by these values, so obtained. The system described so far in the present variant does not require any time measurement to calculate the object's initial path of flight.

If the take-off point is known and the object's local velocity is determined from the two sets of measured coordinates combined with the time delay between sightings, then the data can be combined to define a projected, extended, trajectory and an approximate landing point. This can be done by using an algorithm that incorporates known corrections for air resistance. This trajectory may be displayed in a video presentation and/or range and directional data can be provided to the player through some form of display. Possible displays include visual displays and auditory displays amongst others The associated sensor arrays in each set that monitor a shared, common field of view must be separated from each other so that their respective fields of view intersect at an angle. However, two sensor arrays, each directed to monitoring a different field of view, may be mounted in a single, common support that fixes their angle of orientation to each other. Thus two pods, each containing two such angularly fixed arrays, may be mounted on either side of the object's flight path. This feature of mounting two angularly fixed arrays in each pod provides a fixed value for one of the parameters required for the trajectory calculations, namely the angle between such arrays.

It is further necessary to know the orientations of the respective common fields of view. This may be achieved by mounting the arrays in an assembly which is provided with means for controlling the orientation and positions of the respective arrays, and thereby controlling the orientation and positions of their associated common fields of view.

While the invention that has been described is applicable to golf, baseball, tennis training and the like, it can be usefully employed in any situation wherever there is a need to determine the location of an object, in space, its velocity and its trajectory. It is applicable to both incoming and outgoing objects. The invention is also applicable to tracking an incoming projectile aimed at a target, such as a vehicle.

In the case of a "return" activity, wherein a projectile's trajectory is calculated in the incoming and outgoing directions, data can be obtained during both the incoming and outgoing phases of the path followed by a struck object and used to produce a combined output. Examples of a situation in which this information would be invaluable are the training of a baseball, tennis, or cricket player, or the player of any sport in which a projectile is struck by a device. From this data, a display can be provided that indicates the efficiency of the blow being struck that effects the return.

A further feature of the invention is that over-saturation of the photosensitive array due to excessive illumination, as by the sun, can be achieved by using photodiode arrays with an "anti-blooming" control as well as by the use of wave-length selective optical filters and/or photosensitive optical filtering that darkens when exposed to intense light, i.e., an auto-darkening, photochromic optical filter.

The foregoing summarizes the principal features of the invention and some of its optional aspects. The invention may be further understood by the description of the preferred embodiments, in conjunction with the drawings, which now follow.

BRIEF DESCRIPTION OF THE DRAWINGS

The figures accompanying this disclosure are summarized as follows.

DESCRIPTION OF THE PREFERRED EMBODIMENT

Figure 1:
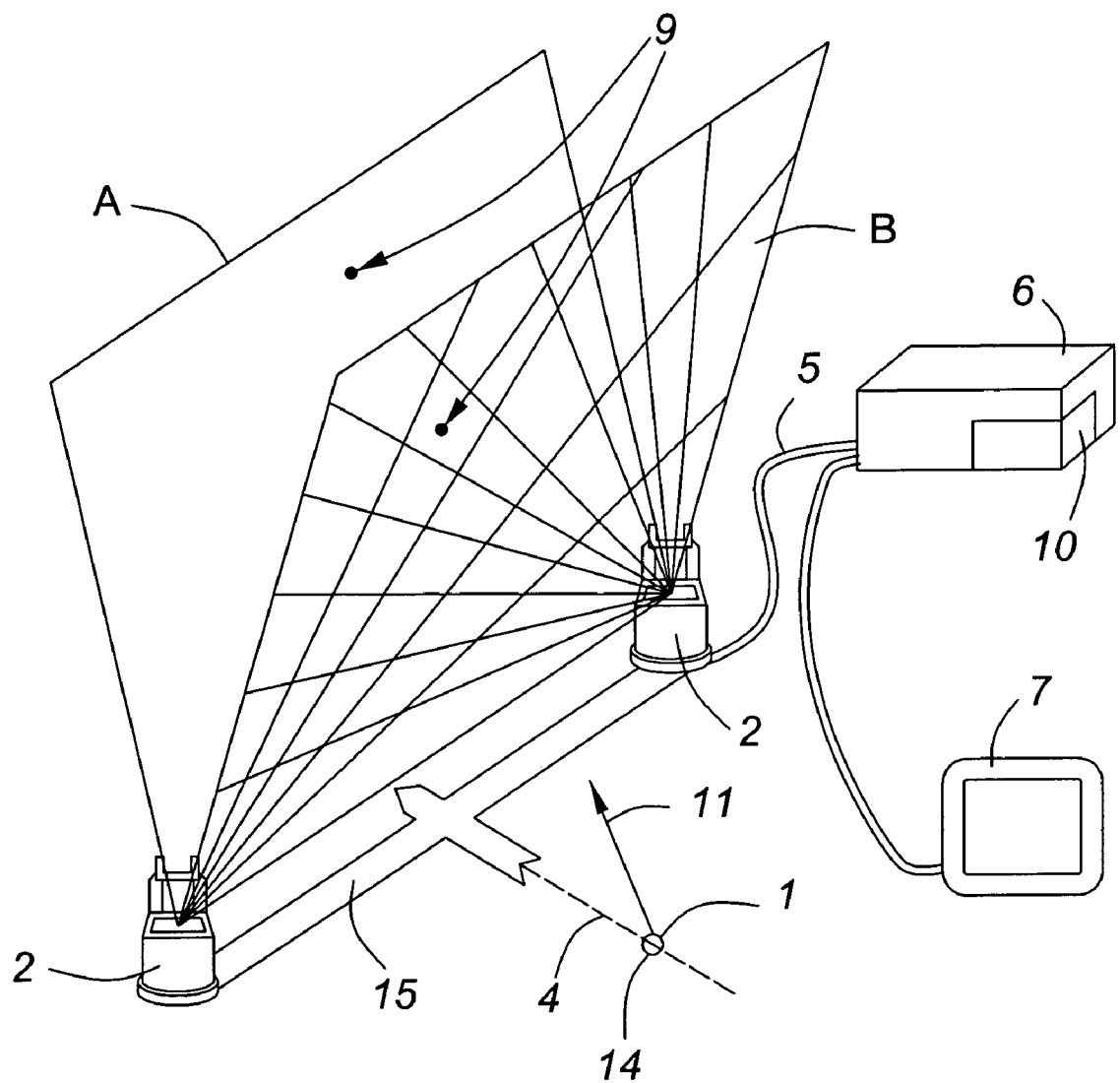
FIG. 1 is a pictorial schematic of the system of the invention applied to golf
Figure 2:
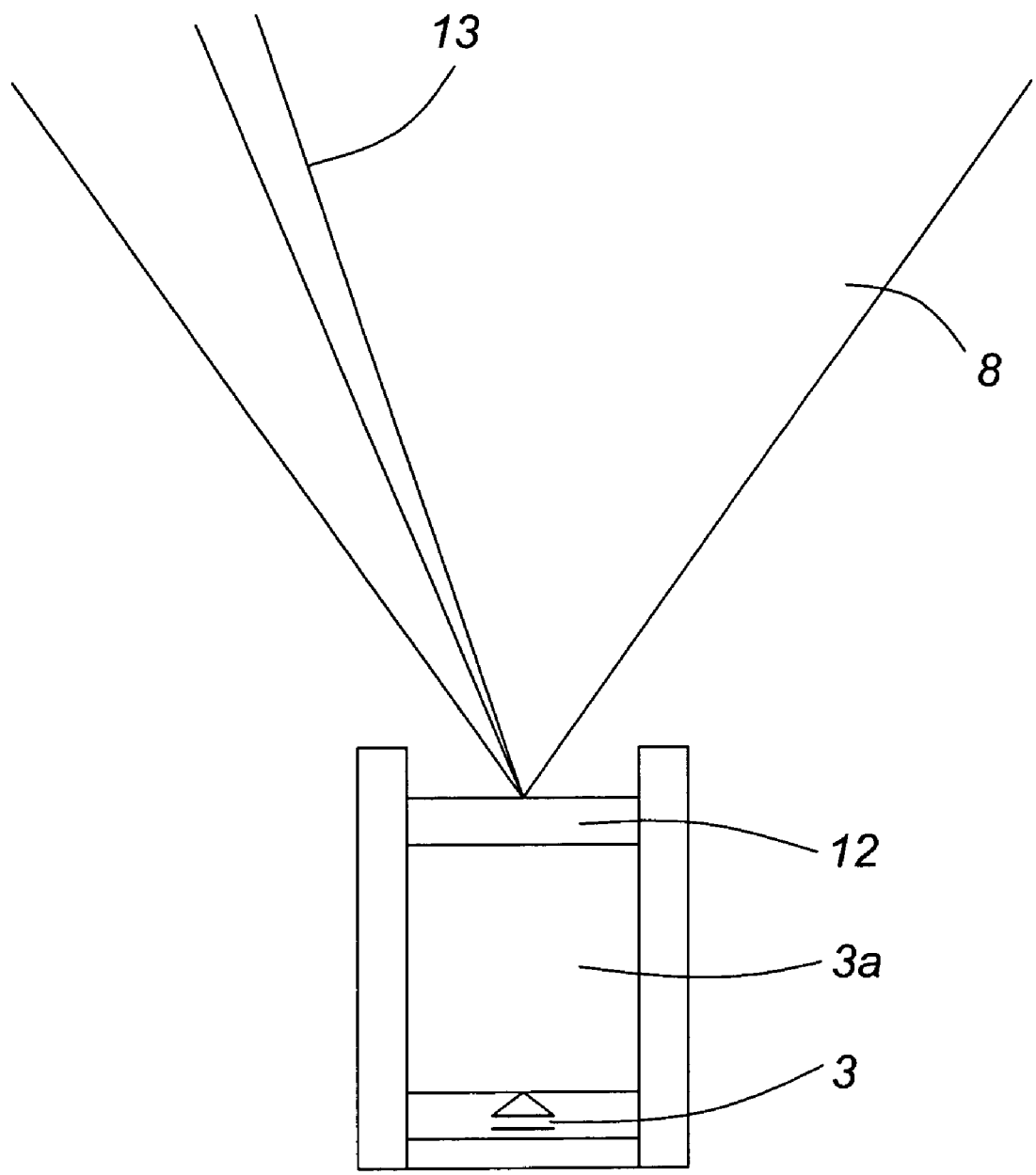
FIG. 2 depicts a position sensor assembly in face view showing a single sensor array.

FIG. 1 illustrates the operation of the system as it tracks a golf ball 1. Two sensor pods 2, each containing two position sensor arrays 3 as shown in FIG. 2, are installed with one pod 2 on either side of the target line 4 at a known separation distance. The "target line 4" is the line over which the object to be sensed is expected to pass. The sensor pods 2 are connected electronically by a wire link 5 or a wireless link to the electronic processing unit 6. This unit sends signals to a display 7.

When the sensor pods 2 are aligned, the fields of view 8 as shown in FIG. 2 generated by each of the respective position sensor arrays 3 in one sensor pod 2 preferably overlap with the fields of view of a corresponding position sensor array 3 in the other sensor pod. This defines two common planar position sensor zones A and B. The sensor arrays 3 which combine to define a sensor zone constitute an associated set of sensor arrays, with one member of the set being present in each sensor pod 2.

As the golf ball 1 crosses these zones, the processor 10 in the electronic unit 6 receives the data as to the location of the object within each zone A, B and calculates by triangulation, using standard geometric analysis, the coordinates of the penetration points 9. The electronic processor 10 also calculates the distance between such penetration or points and the ball's travel time between these points. From this data, the processor 10 can determine the ball's velocity vector including the speed of the ball 1, the take-off angle θ with respect to the horizontal plane, and the angular deviation of the flight path from the target line 4 in the horizontal plane.

Using established ballistics data, the processor 10 can estimate the ball's projected trajectory and the range of the drive. Range calculations take into account aerodynamic effects acting on the ball 1 using known data and procedures. These calculations can include the use of previously generated tables based upon the known behaviour of objects such as golf balls.

A description of the system's components and operation follows.

Figure 5:
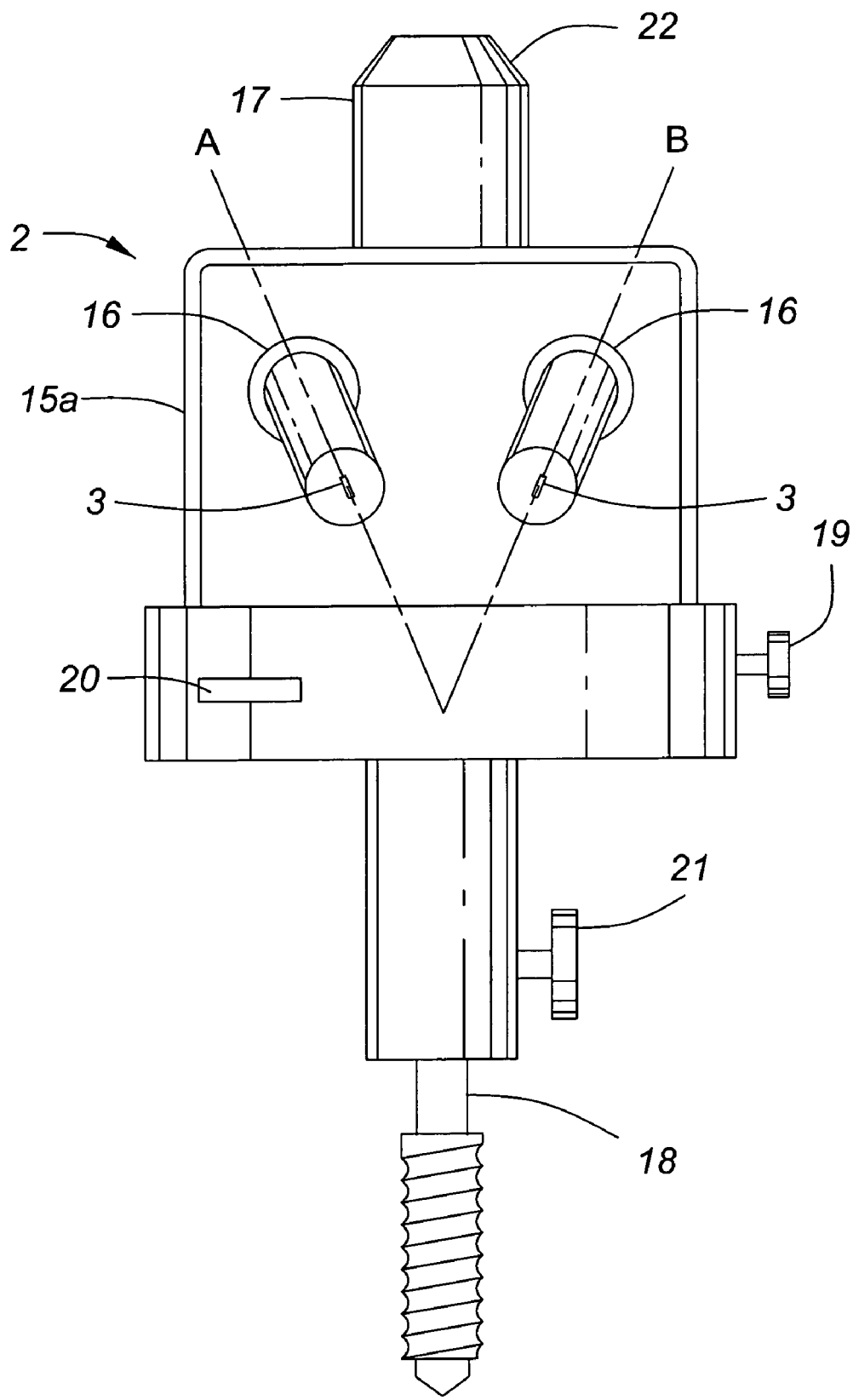
FIG. 5 is a schematic of a sensor pod with two sensor arrays mounted at a fixed angle to each other and inclined away from the viewer to be directed towards a flight path.

Each sensor pod 2 contains a set of two position sensor arrays 3 and two lenses 3a, as shown individually in FIG. 2 and collectively in FIG. 5. Each position sensor array 3 consists of a linear array of photodiodes and a charge-coupled device (CCD) providing data inputs to a processor 10 in the electronic unit 6. A sensor array 3 in one pod 2 is paired with a sensor array 3 in the other pod 2 to create a set of associated sensor arrays for purposes of detecting an object present in their respective, shared, intersecting fields of view A, B.

The photodiode array 3 may be equipped with an "anti-blooming" control, i.e. an operational feature that prevents over exposure of the diodes or the spill over of excessive charge from a pixel irradiated by the image of the sun to its neighbours on either side. This feature could be further enhanced by use of a wavelength selective band-pass filter 12 (see FIG. 2) or a photochromic, auto-darkening optical filter whose attenuation increases when exposed to sunlight.

Known position sensor assemblies suitable for this application have characteristics similar to the device described as follows:

| Lens characteristics | f/1.8 |
| --- | --- |
| Focal length | 3.8 mm |
| Detector | linear photodiode array |
| Number of diodes (pixels) | 512 (typically) |
| Width of linear array | 0.013 mm |
| Diode pitch | 0.013 mm |
| Length of array | 6.656 mm |

Each position sensor 3 has a fan-shaped field of view 8 whose angular dimensions are 82.4 degrees by 0.196 degrees, consisting of 512 detection zones (see FIG. 2). Each pixel detection zone 13 has angular dimensions of 0.161° (average)×0.196°. The fields of view 8 of the position sensors in each assembly are aligned to intersect substantially within a common, shared planar field of view, designated as position sensor detection zones A and B in FIG. 1. This allows an object within the common, shared planar field of view to be located by a set of polar coordinates overlaid on the shared planar field of view in position sensor zones A and B (see FIG. 3) as explained in the following description. The position sensors face the luminous sky and the target may appear either as a darker object against the lighter background, or as a lighter object against a darker background. In either case, its arrival causes a change in the intensity of the light sensed by the respective sensor arrays 3.

When a ball 1 crosses position sensor zones A and B, its image on the photodiode arrays 3 covers a certain number of pixels. As the processor in the electronic unit scans each array 3, typically at a minimum rate of 2 kHz, it identifies the ball's location in position sensor zone A and B by the differential effects created by the presence of the ball 1 in the field of view 8.

Figure 4:
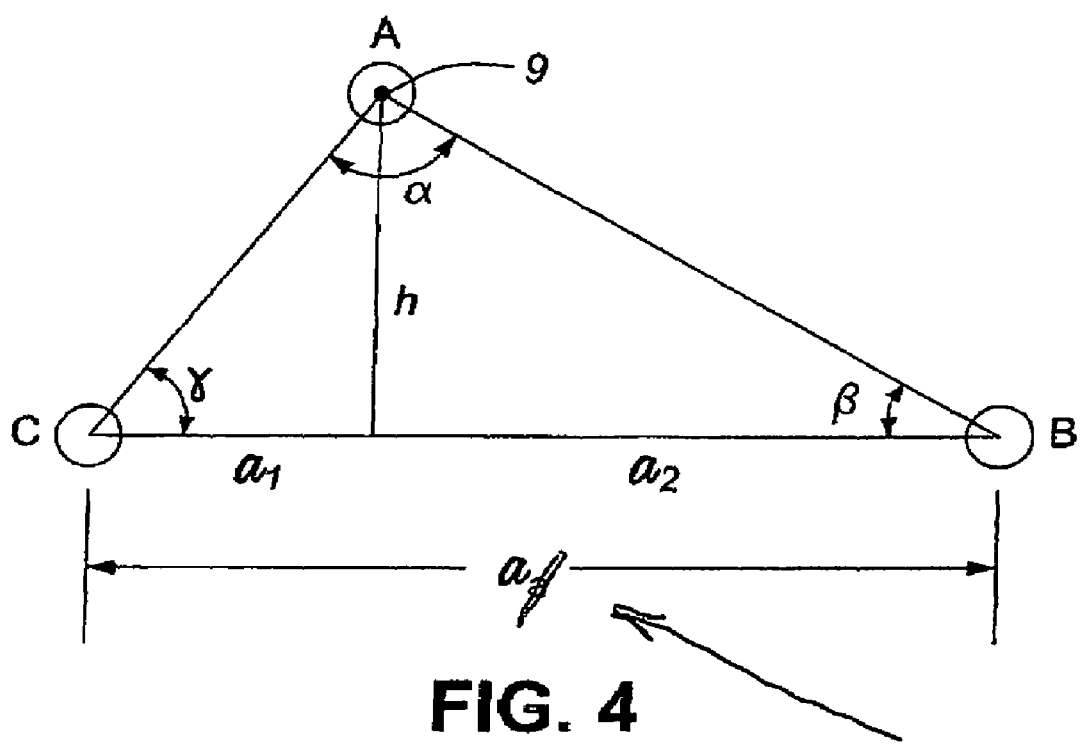
FIG. 4 illustrates the geometric principles for determination of the ball's coordinates within a single position sensor zone.

The identification can be achieved by subtracting from each data bit stream of a scan the stored data bit stream of the preceding scan. Since the data of the background illumination remains the same during both scans, they are eliminated by this operation and the remaining singularity in the most recent frame is the image of the ball 1. The processor 10 in the electronic unit 6 determines the center of this image which it uses as the location of the object. It then calculates from the viewing angles $\beta$ and $\gamma$, (FIG. 4), the x-coordinate $a_1$ and y-coordinate h of the object from the following equations in respective each of the sensor zones A and B:

$$a_1 = a \frac{\tan\beta}{\tan\beta + \tan\gamma} \quad (1)$$

$$h = a \frac{\tan\beta \tan\gamma}{\tan\beta + \tan\gamma} \quad (2)$$

As an example, a golf ball (1.68 in.=4.22 cm diameter) at a distance or 1.5 m subtends an angle of 1.61° and its image on the detector array can cover 10 to 11 pixels. It will be assumed that angles $\beta$ and $\gamma$ can be measured with an r.m.s. error of two pixels; i.e. 0.322 °=0.00562 rad. The corresponding errors $\Delta a_1$ and $\Delta h$ can be calculated from the following equations:

$$\Delta a_1 = \sqrt{\left(\frac{\partial a_1}{\partial \beta}\Delta\beta\right)^2 + \left(\frac{\partial a_1}{\partial \gamma}\Delta\gamma\right)^2} \quad (3)$$

$$\Delta h = \sqrt{\left(\frac{\partial h}{\partial \beta}\Delta\beta\right)^2 + \left(\frac{\partial h}{\partial \gamma}\Delta\gamma\right)^2} \quad (4)$$

Where:

$$\frac{\partial a_1}{\partial \beta} = a\frac{\tan\gamma}{\cos^2\beta(\tan\beta+\tan\gamma)^2} \quad (5)$$

$$\frac{\partial a_1}{\partial \gamma} = -a\frac{\tan\beta}{\cos^2\gamma(\tan\beta+\tan\gamma)^2} \quad (6)$$

$$\frac{\partial h}{\partial \beta} = a\frac{\tan^2\gamma}{\cos^2\beta(\tan\beta+\tan\gamma)^2} \quad (7)$$

$$\frac{\partial h}{\partial \gamma} = a\frac{\tan^2\beta}{\cos^2\gamma(\tan\beta+\tan\gamma)^2} \quad (8)$$

For $\beta=16.0°$, $\gamma=63.4°$ and $\alpha=1.5$ m the following r.m.s. errors were calculated:

$$\Delta a_1 = 0.6 \text{ cm} \quad \Delta h = 1.0 \text{ cm}$$

The velocity vector of the ball 1 can be determined from the coordinates of the penetration points 9 in position sensor zones A and B, and the flight time between them.

The calculation of penetration points 9 in position zones A and B is sufficient to determine the golf ball's trajectory. This data alone can be provided to a display to inform a player as to the direction of travel of a struck ball 1. To provide a read-out of range, further data must be acquired. The projected trajectory of a struck object is a parabola that has to be corrected for aerodynamic drag. Equation (9) describes a parabola which intersects the x-axis at point x=0, the known location for the commencement of the golf ball's trajectory. This parabola also intersects the x-axis at x=m/n.

$$y = mx - nx^2 \quad (9)$$

Using different parameters, $$m = \tan\theta \quad (10)$$

$$n = G/2(v_0 * \cos\theta)^2 \quad (11)$$

where $\theta$ is the take-off angle, G is the gravitational constant and $v_0$ is the ball's take-off velocity.

The parabola can be defined if the parameters m and n are known. They can be calculated by substituting the coordinates of the two penetration points 9 into equation (9). This operation results in two equations, which suffice to calculate the two unknowns m and n and thereby define the parabolic trajectory. A parabolic path can be determined because the point of origin or take-off point for the golf ball 1 is also known. Consequently, the trajectories of objects can be determined without measuring time so long as the distance along the target line 4 from the take-off point 14 to the base-line 15 is known.

The parabola can be defined if the parameters m and n are known. They can be calculated by substituting the coordinates of the two penetration points 9 into equation (9). This operation results in two equations, which suffice to calculate the two unknowns m and n and thereby define the parabolic trajectory. A parabolic path can be determined because the point of origin or take-off point for the golf ball 1 is also known. In addition, velocity $v_0$ of objects can be determined without measuring time from equations (10) and (11) so long as the distance along the target line 4 from the take-off point 14 to the baseline 15 is known.

If this distance is not known, it may be approximated by projecting a straight line through the penetration points 9 of the object back from detection zones A and B to the horizontal plane. The resulting intersection point is close to the origin because the initial part of the parabolic path can be approximated by a straight line. The velocity determination, based on the delay between penetration of the two zones A, B can be used to calculate the parabolic path from which range can thereafter be established.

If the distance to the take-off point 14 is also known, calculations may be made using both methods and the results may be combined for improved accuracy.

The projected trajectory can then be corrected for aerodynamic drag by using pre-calculated ballistic data that apply to a golf ball or baseball or the like. Such data is available from a number of sources and can be obtained in the case of a golf ball, for example, from P. W. Behrman, J. K. Harvey, Golf Ball Aerodynamics, Aeronautical Quarterly, p. 112-122, May 1976.

The foregoing has been directed to calculating future trajectories. The past trajectory of an arriving object can also be calculated, again using ballistic analysis, to determine the origin of an object of a known type arriving under its own momentum. This can have military applications, as where it is desired to determine the firing point of an incoming hostile ballistic projectile.

The system configuration described offers the following features:
- Four fields of view are merged in two planes (detection zones A and B), simplifying the calculation burden.
- The penetration points in both zones and the distance between them can be calculated by simple triangulation, independently of time.
- The flight trajectory can be modeled as a parabolic trajectory corrected for aerodynamic drag without time measurements if the take-off point is known, but time measurements can be taken into account to provide an alternate calculation and increased accuracy.

To determine the velocity vector, two time measurements, as the ball crosses position sensor zones A and B, are required.

For a known object having known air resistance characteristics, a parabolic trajectory corrected for aerodynamic drag can then be calculated.

The system is bi-directional, this means that it can measure all the above quantities regardless of flight direction, left to right or right to left with respect to position sensor zones A and B.

Flight paths can be established for objects, both incoming and outgoing.

Description of a Sensor Pod

Figure 3:
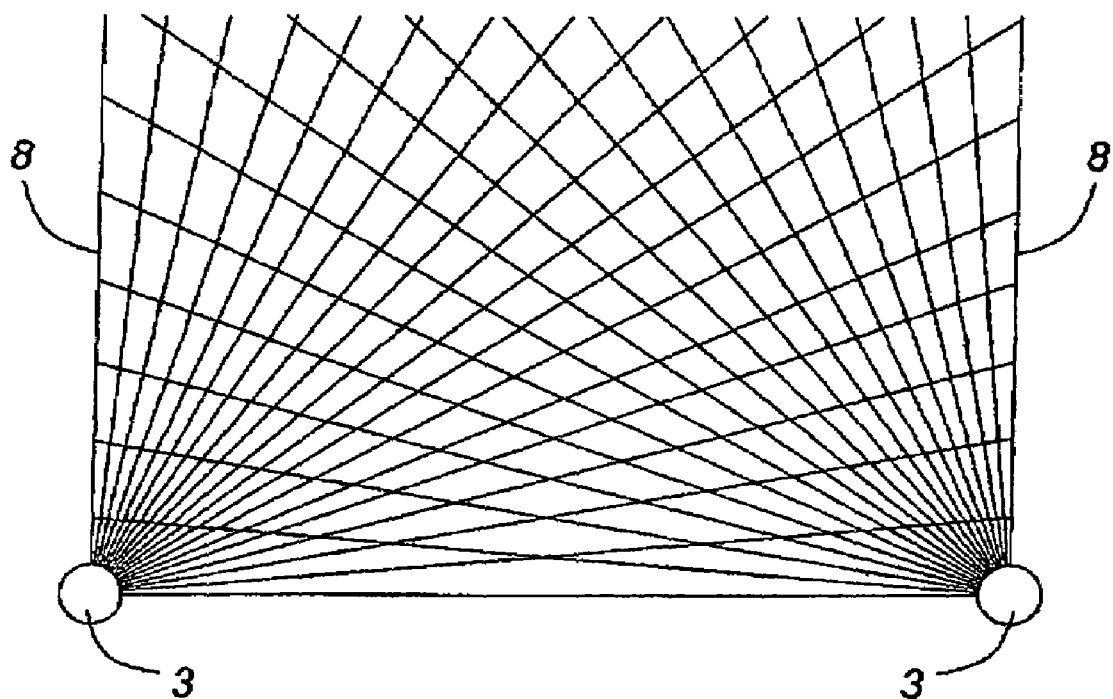
FIG. 3 depicts a set of two associated arrays whose fields of view overlap to provide a single position sensor zone.

The sensor pod 2 is illustrated in FIG. 5. It consists of a weatherproof housing 15A fitted with two windows 16 and a handle 17 pierced by an opening (not seen in FIG. 5). The housing 15 contains two position sensor arrays 3 mounted in two planes, typically at an angle of 45 degrees with respect to each other and angled sideways to address the flight path. This configuration produces overlapping fields of view whereby sets of associated arrays in each sensor pod define the position sensor zones A and B. This is illustrated in FIG. 3.

An earth anchor/mounting post 18, shown as a screw-threaded spike, supports the assembly. The mounting post 18 may be screwed into the ground by turning the handle 17. The housing 15a can be rotated on this support and locked in position by a horizontal lock 19 as part of the alignment procedure. The support 18 may be equipped with a level 20, such as a trapped air bubble, to ensure that the alignment takes place in a horizontal plane. The support may be mounted on a telescopic post with a vertical lock 21 allowing height adjustments where this is required. Otherwise, the units are installed on a horizontal surface.

The two sensor pods 2 are installed separated by a known distance apart. This can be measured by using a wire or equivalent tether to serve as a baseline 15. Normally, the baseline 15 would lie a short distance in front of the take-off point 14, intersected approximately centrally by the target line 14 i.e. the horizontal projection of the target's path of flight. Data from the sensor pods 2 to the electronic unit 6 can be transmitted either over wire 5 or over a wireless link. In the former approach a section of the wire link from the left sensor pod 2 to the right sensor pod 2 (FIG. 1) can be installed under or with the baseline 15.

The two sensor pods 2 can be installed, as an example, either at a golf tee or in a space reserved for golf practice, or in front of a batter's position, in the following manner (FIG. 1):

1. A typically 2-m long aluminum or plastic baseline 15 is placed perpendicularly to the target line 4 over which an object is to pass.
2. The posts 18 are inserted vertically in the ground or other support surface at the ends of the baseline 15 by turning the handle 17 and relying on the level 20 as a reference.
3. The sights 22, initially optionally folded in the handle 17, are then erected, and the sensor housings 15a are rotated until the sights 22 are aligned. The sensor housings are then locked in position by the horizontal lock 19. If vertical adjustments are necessary, they can be achieved by vertically displacing and locking the post's telescoping parts with the vertical lock 21. The horizontal alignment should be checked after a vertical adjustment to ensure it has not been disturbed. In an alternate alignment procedure, small lasers mounted in the handle could replace the pop-up sights.

Following this installation procedure, the wiring links are effected and the electronic unit 6 is switched on. All the ensuing calculations are based on the distance between the sensor pods 2 determined by the baseline 15, the distance from the take-off point 14 to the baseline (if required) and the angles of the detected projectile as measured by the position sensors 3. As soon as a ball 1 crosses position sensor zones A and B, the electronic unit 6 can present the following data on display 7:

Speed,

Take-off angle in the vertical plane,

Deviation from the target line in the horizontal plane,

Projected or hit range.

While it is well known that golf balls can curve significantly in flight, knowing a projected value for a range can nevertheless provide a useful incentive for golfing practice.

The system can be used for golf or batting practice in a restricted space where a net catches the ball. It can also be installed at a tee or baseball diamond and display the above data to each player participating in the game, as well as to an audience. Such displays can include a video depiction of the projected trajectory, in real time.

Figure 6:
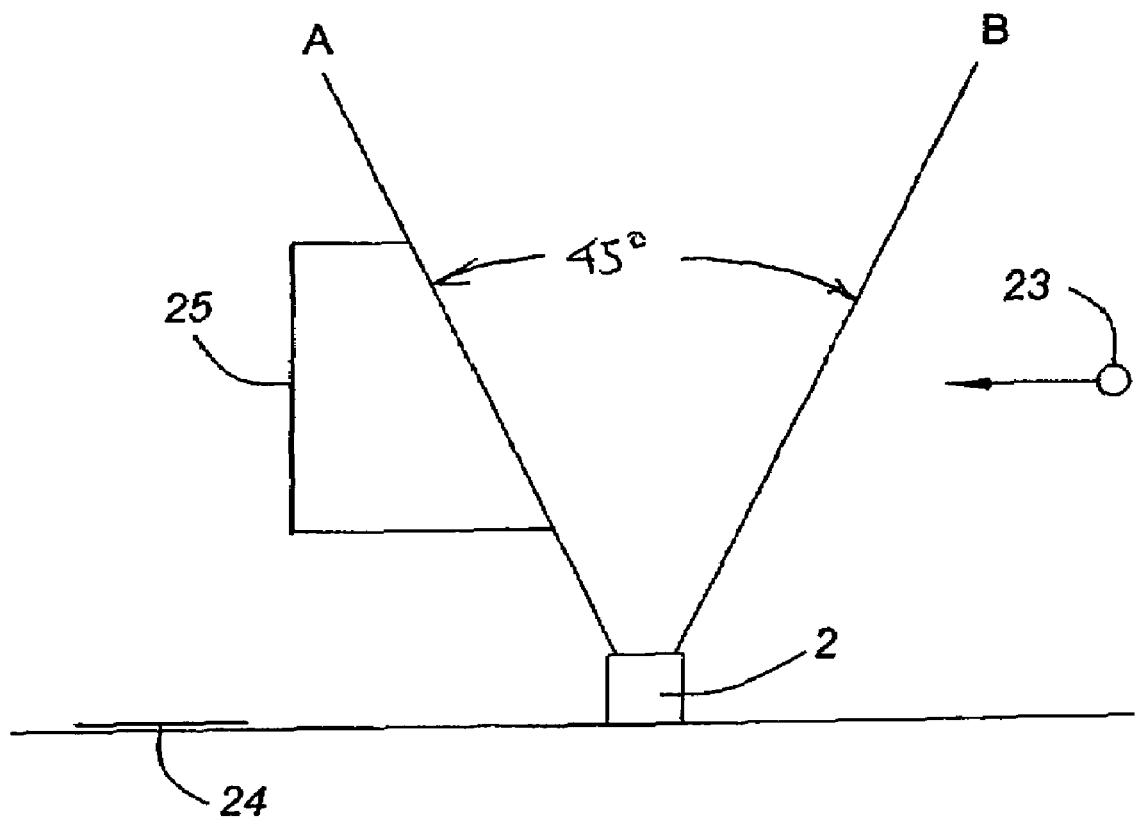
FIG. 6 shows the side view of the position sensor zones and of the strike zone plane in baseball for use in determining the accuracy of a pitched baseball.

In baseball, sensor pods 2 can be installed so that the detection zones A,B lie in the path of the pitched ball 23, preferably in front of the home base 26 on either side of the reference line running through the centre of the pitcher's circle and the centre of the home base circle (see FIG. 6). The electronic unit 6 can then calculate the speed of the ball 23 as well as its direction in the horizontal and vertical plane, both after being thrown by the pitcher and after being hit by the batter. This information can be presented on display 7 and recorded, to be reviewed by the coach, players and fans or posted instantaneously for all to view.

Under controlled conditions, the system can be used to evaluate the mechanical characteristics of a bat, racket or the like by comparing the momentum of the pitched ball to the momentum of the ball after being struck. The display can include a presentation of the ratio of the outgoing speed to the incoming speed. It can also depict the direction of the struck ball, both vertically and horizontally.

Furthermore, the system may be used to train a pitcher by creating in space an optronic strike zone 25, whose width is equal to that of the front rim of the home plate (17 in.) and whose height is equal to the distance between a hypothetical or real batter's shoulder and knees (approximately 3.5 ft). In an actual game, the strike zone 25 would have to be adjusted to accommodate each batter. For training pitchers, a standard, fixed strike zone can be provided.

The corners of the rectangle of the strike zone are defined by coordinates in a vertical plane to which correspond values of $a_1$ and h in position sensor zone A. The latter sensor zone A is inclined at an angle of 22.5 degrees with respect to the vertical, as shown in FIG. 6. In the conversion from $a_1$ and h coordinates in position sensor zone A to the x,y coordinates in the plane of the strike zone, $a_1$ remains the same while h has to be multiplied by cos 22.5°=0.924. When a baseball 23 crosses position sensor zone A, its coordinates are calculated, converted to the coordinates in the plane of the strike zone 25 and compared to the corner coordinates of the latter. While the center of the ball 23 is initially tracked, allowances for the width of the ball can be made. This sequence of mathematical operations establishes whether or not the baseball 23, or a portion of the baseball 23, has crossed through the strike zone 25. Observers can then be informed of the positive or negative outcome of this event on an alphanumeric or other display means.

In this scenario, the system plays the role of an electronic umpire. The training can be rendered more realistic by installing dummies made of elastic material to serve as a simulated batter and a catcher at the home base. The realism of the training practice can be further enhanced by placing at least one additional set of two, of sensor arrays, or preferably a further pair of pods 2, one on either side of the center line extending between the pitcher's circle and the home base circle. In this configuration the system can track a curve ball and display the top view of its trajectory relative to the strike zone 25 on a video screen.

Conclusion

The foregoing has constituted a description of specific embodiments showing how the invention may be applied and put into use. These embodiments are only exemplary. The invention in its broadest and more specific aspects is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

I claim:

1. A system for locating and tracking a path of an object traveling in space comprising:
   a) first and second sets of two member linear sensor arrays operating in the visible or near-infrared spectrum and having respective lenses therein, each set of two member sensor arrays being separated from the other set by a known baseline;
   b) each member sensor array within each set having a plurality of directed pixel sensors positioned to provide individual pixel fields of view which collectively provide a planar field of view for each such member sensor array, said planar field of view being defined by the respective lens;
   c) the respective sets of sensor arrays being mounted so that the individual planar field of view of each member of the first set of sensor arrays substantially overlaps with the planar field of view of a respective member of the second set of sensor arrays to provide two shared, substantially common planar fields of view, each common planar field of view having a known angle of inclination in space;
   d) signal generation means associated with each of the members of each set of sensor arrays to generate signals corresponding with the detected presence of the object passing through the planar field of view of each such member sensor array;
   e) electronic processing means connected to receive signals from said signal generation means for calculating the positions of the object as it passes through the respective common fields of view, and being provided with means for calculating a calculated extended path for the object based upon the path in the region between the common planar fields of view being a generally parabolic path to thereby determine the calculated extended path in space of the object as it passes immediately beyond the respective, common planar fields of view; and
   f) display means connected to the processing means to provide a display based upon the calculated extended path.

2. A system as in claim 1 wherein said processing means includes means for calculating the extended path of the object when launched from a known location to provide the said display.

3. A system as in claim 2 wherein said electronic processing means comprises ballistics processing means to provide the calculated extended path in space of the object as a projected ballistic trajectory to provide the said display.

4. A system as in claim 2 wherein said electronic processing means includes means to calculate the initial velocity at the known location without making any time measurements.

5. A system as in claim 1 wherein said electronic processing means includes means to calculate a hypothetical point of origin of the object, using the distance of the hypothetical point of origin from the baseline to calculate the extended path for the object to provide the said display.

6. A system as in claim 5 wherein said electronic processing means comprises ballistics processing means to provide the calculated extended path in space of the object as a projected ballistic trajectory to provide the said display.

7. A system as in claim 1 wherein said electronic processing means comprises ballistics processing means to provide the calculated extended path in space of the object as a projected ballistic trajectory to provide the said display.

8. A system as is claim 1 wherein said electronic processing means comprises means for determining the path of the object consecutively when the object traverses both common fields of view, traveling in both directions, both incoming and outgoing and wherein said display means provides a display based thereon.

9. A system as in claim 8 wherein said electronic processing means comprises ballistics processing means to provide the calculated extended path in space of the object as a projected ballistic trajectory to provide the said display.

10. The system as in claim 1 wherein the members of the respective first and second sets of sensor arrays are respectively installed in a pair of pods, each pod containing two member sensor arrays, such members in each pod being fixed together to provide respective fields of view that are oriented at a known angle to each other.

11. The system of claim 10 comprising mounting means whereby each such pod may be installed on a support surface with the fields of view of the sensor arrays contained therein positioned at fixed, known orientations with respect to the support surface.

12. The system as in claim 11 wherein said pair of pods are installed at a spaced separation from each other in the vicinity of a golf tee.

13. The system as in claim 11 wherein said pair of pods are installed in proximity to a baseball home plate that is opposite to a pitcher's mound at a spaced separation from each other on either side of the line joining the pitcher's mound to home plate.

14. The system of claim 1 comprising optical filter means positioned to filter light arriving from the field of view of each sensor array, said optical filter means being an selective wave-length optical filter.

15. The system of claim 1 comprising optical filter means positioned to filter light arriving from the field of view of each sensor array, said optical filter means being a selective wave-length optical filter.

16. A system for locating and tracking a path of an object traveling in space comprising:
   a) first and second sets of two member linear sensor arrays operating in the visible or near-infrared spectrum and having respective lenses therein, each set of two member sensor arrays being separated from the other set by a known baseline;

b) each member sensor array within each set having a plurality of directed pixel sensors positioned to provide individual pixel fields of view which collectively provide a planar field of view for each such member sensor array, said planar field of view being defined by the respective lens;

c) the respective sets of sensor arrays being mounted so that the individual planar field of view of each member of the first set of sensor arrays substantially overlaps with the planar field of view of a respective member of the second set of sensor arrays to provide two shared, substantially common planar fields of view, each common planar field of view having a known angle of inclination in space;

d) signal generation means associated with each of the members of each set of sensor arrays to generate signals corresponding with the detected presence of the object passing through the planar field of view of each such member sensor array;

e) electronic processing means connected to receive signals from said signal generation means for calculating the positions of the object as it passes through the respective common fields of view, and being provided with means for calculating the path for the object based upon such path being a generally parabolic path in the region between the common planar fields of view to thereby determine a calculated extended path in space of the object as it passes immediately beyond the respective, common planar fields of view; and f) display means connected to the processing means to provide a display based upon the calculated extended path wherein said electronic processing means includes means to record the times at which the object passes through the respective, common fields of view and, using the delay between the passage of the object through the respective common fields of view, to calculate the velocity of said object there between, wherein the display is, based upon such calculated velocity and the positions of the object as it passes through the respective common fields of view.

17. A system as in claim 16 wherein said electronic processing means comprises ballistics processing means to provide the calculated extended path in space of the object as a projected ballistic trajectory to provide said path display.

18. A system for locating and tracking a path of an object traveling in space comprising:

a) first and second sets of two member linear sensor arrays, each set of two member sensor arrays being separated from the other set by a known baseline;

b) each member sensor array within each set having a plurality of directed pixel sensors positioned to provide individual pixel fields of view which collectively provide a planar field of view for each such member sensor array;

c) the respective sets of sensor arrays being mounted so that the individual planar field of view of each member of the first set of sensor arrays substantially overlaps with the field of view of a respective member of the second set of sensor arrays to provide two shared, substantially common planar fields of view, each common field of view having a known angle of inclination in space;

d) signal generation means associated with each of the members of each set of sensor arrays to generate signals corresponding with the detected presence of the object passing through the field of view of each such member sensor array;

e) electronic processing means connected to receive signals from said signal generation means for calculating positions of the object as it passes through the respective common fields of view and for determining the velocity of the object consecutively when the object traverses both common fields of view, traveling in both directions, both incoming and outgoing;

f) display means connected to the processing means to provide a display based upon the incoming and outgoing velocity of the object so determined.

19. A system as in claim 18 wherein the display means provides the display based on the relative incoming and outgoing velocities of the object.

20. The system as in claim 18 wherein the members of the respective first and second sets of sensor arrays are respectively installed in a pair of pods, each pod containing two member sensor arrays, such members in each pod being fixed together to provide respective fields of view that are oriented at a known angle to each other, such pods comprising mounting means whereby each such pod may be installed on a support surface with the fields of view of the sensor arrays contained therein positioned at fixed, known orientations wherein said pair of pods are installed in proximity to a baseball home plate that is opposite to a pitcher's mound at a spaced separation from each other on either side of the line joining the pitcher's mound to home plate.

21. A system as in claim 20 wherein the display means provides the display based on the relative incoming and outgoing velocities of the object.

22. A system for locating and tracking a path of an object traveling in space comprising:

a) first and second sets of two member sensor arrays operating in the visible or near-infrared spectrum and having respective lenses therein, each set of two member sensor arrays being separated from the other set by a known baseline;

b) each member sensor array within each set having a plurality of directed pixel sensors positioned to provide individual pixel fields of view which collectively provide a planar field of view for each such member sensor array, said planar field of view being defined by the respective lens;

c) the respective sets of sensor arrays being mounted so that the individual planar field of view of each member of the first and second sets of sensor arrays intersects the potential path of the object passing through the respective planar fields of view for each such member sensor array, the planar field of view for each such member sensor array each having a known angle of inclination in space;

d) signal generation means associated with each of the members of each set of sensor arrays to generate signals corresponding with the detected presence of the object passing through the respective planar field of view of each such member sensor array;

e) electronic processing means connected to receive signals from said sensor arrays for calculating positions of the object as it passes through the respective fields of view, and being provided with means for calculating an extended path for the object based upon such path being a generally parabolic path in the region between the respective fields of view of each such member sense for away to thereby determine a calculated path in space of the object as it passes immediately beyond the respective, fields of view; and f) display means connected to the processing means to provide a display based upon the calculated extended path.

23. A system for locating and tracking a path of an object traveling in space comprising:

a) first and second sets of two member sensor arrays operating in the visible or near-infrared spectrum and having respective lenses therein, each set of two member sensor arrays being separated from the other set by a known baseline;

b) each member sensor array within each set having a plurality of directed pixel sensors positioned to provide individual pixel fields of view which collectively provide a planar field of view for each such member sensor array, said planar field of view being defined by the respective lens;

c) the respective sets of sensor arrays being mounted so that the individual planar field of view of each member of the first set of sensor arrays substantially overlaps with the planar field of view of a respective member of the second set of sensor arrays to provide two shared, substantially common planar fields of view, each common planar field of view having a known angle of inclination in space;

d) signal generation means associated with each of the members of each set of sensor arrays to generate signals corresponding with the detected presence of the object passing through the respective planar field of view of each such member sensor array;

e) electronic processing means connected to receive signals from said sensor arrays for calculating the positions of an object as it passes through the respective common planar fields of view, and being provided with means for calculating the path for the object to thereby determine a calculated extended path in space of the object as it passes immediately beyond the respective, common planar fields of view; and f) display means connected to the processing means to provide a display based upon the calculated extended path.

* * * * *